Dec. 11, 1945.   F. W. BRETH ET AL   2,390,917
PROCESS FOR REFINING PETROLEUM OILS
Original Filed March 14, 1939   2 Sheets-Sheet 2

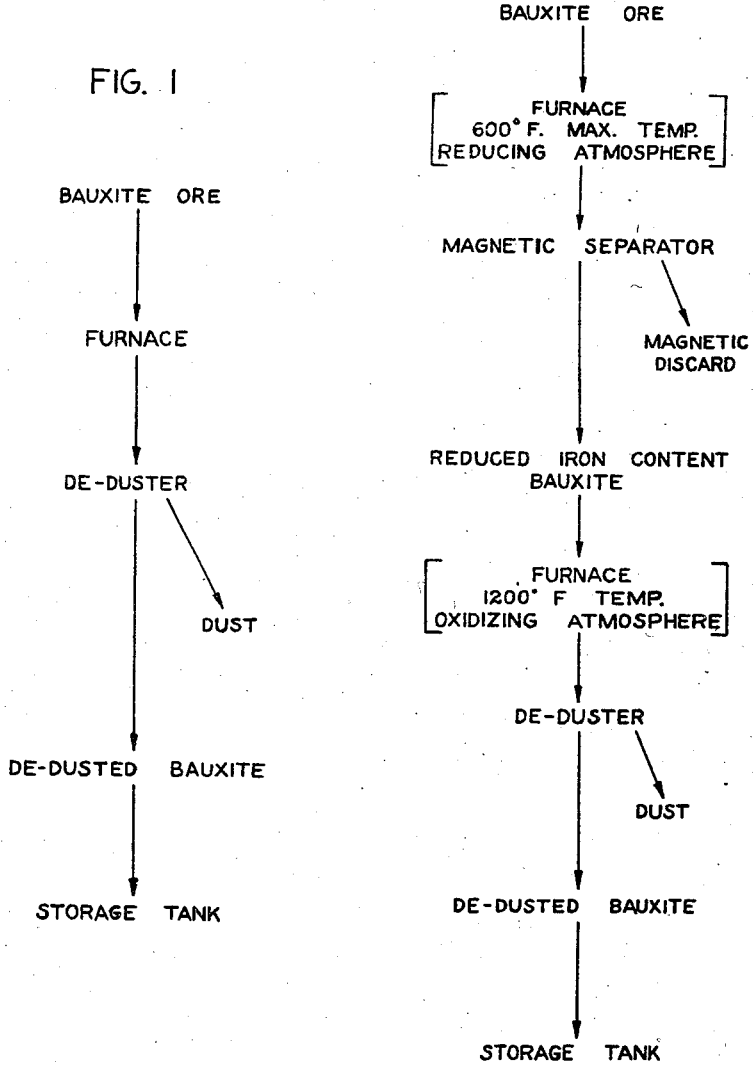

INVENTORS
FERDINAND W. BRETH
ANTHONY KINSEL
BY Norbert E. Birch
ATTORNEY

Patented Dec. 11, 1945

2,390,917

UNITED STATES PATENT OFFICE 2,390,917

PROCESS FOR REFINING PETROLEUM OILS

Ferdinand W. Breth and Anthony Kinsel, Petrolia, Pa., assignors to L. Sonneborn Sons, Inc., New York, N. Y., a corporation of Delaware Original application March 14, 1939, Serial No. 261,790. Divided and this application October 2, 1943, Serial No. 504,808

4 Claims. (Cl. 196—147)

This invention relates to new and useful improvements in the refining of petroleum hydrocarbons.

The present application is a division of our application Serial No. 261,790, filed March 14, 1939, entitled Bauxite adsorbents and processes of making and using same.

The conventional liquid phase refining treatment of petroleum hydorcarbons including residue and distillates, such as kerosene, gasoline, lubricating oils, transformer oils, medicinal oils, petrolatum, paraffin, etc., generally involves the use of solid adsorbent materials to improve the color of such products and/or to effect a partial desulphurization of the same. For this purpose the hydrocarbons are brought into contact with the adsorbent material. This may be accomplished in various ways, such as by admixing the adsorbent material in a finely divided form with the hydrocarbon to be refined and thereafter separating the mixture by means of a filter press which retains the adsorbent material, which process is commonly referred to as "contacting," or, alternatively, by passing the hydrocarbon material through a bed of the adsorbent from which it issues in a decolorized condition. The latter procedure is commonly referred to as "percolation." If the hydrocarbon to be refined is solid or semi-solid at ordinary temperatures, such as paraffin, petrolatum, and like substances, it is contacted with the adsorbent material, preferably in molten condition or dissolved in a suitable solvent. The term "decolorized" or such similar expression as used in the industry and in this application does not necessarily connote the removal of visible coloring matter only. It also connotes improvement of the original color by virtue of removal of colorless compounds which are converted to visible coloring matter by the polymerizing action of the adsorbent material. The adsorbent material principally used in the industry in the percolation method is generally a clay of the fuller's earth type which has been specially processed to develop its adsorbent characteristics; for example, it may be subjected to heat or acid treatment or both.

Percolation through bauxite has been used to some extent for the refining of some petroleum hydrocarbons. Bauxite, however, as it is obtained from the mine, possesses only very weak adsorbent properties, and acquires enhanced adsorbent properties only after heat treatment which is generally referred to in the industry as the activation of the bauxite.

The activation of the bauxite is usually carried out by heating the same to temperatures of the order of from 600 to 1600° F. Such treatment imparts to the bauxite enhanced adsorptive properties which may be regenerated after the bauxite becomes exhausted during use, by again roasting same at temperatures of the order of the magnitude aforesaid.

We have discovered that the adsorptive characteristics of bauxite may be substantially increased by selecting a bauxite of a particular predetermined type, and subjecting it to a special activation treatment. A bauxite of improved activity results, and when used in the refining of petroleum oil products, it will not only give higher yields but will also furnish products of a higher degree of purification than could be obtained with a bauxite selected and activated in accordance with hitherto known practices.

The bauxite used in accordance with our invention is preferably a bauxite having at least 20% by weight of water of constitution and having a particle size predominantly between 20 and 80 mesh.

Suitable bauxites possessing such desired characteristics are found, for instance, among the bauxites containing water of constitution above 20%, such as Arkansas bauxites with a water of constitution of from approximately 29 to 30%, bauxites from India of about 23.8% water of constitution, bauxites from Alabama with a water of constitution between 25 and 30%, bauxites from Georgia with a water of constitution between 29.1 and 33.5%, etc. It is of course understood that the water of constitution is not critical and that bauxites with lower percentages may be used, provided they exhibit the afore-mentioned characteristics, though we have found as a general rule that bauxites possessing such characteristics and having at the same time a water of constitution of at least 20% will give best results.

In the refining of hydrocarbons derived from petroleum oils by percolation through bauxite, we prefer to use a range of particle size between 20 and 80 mesh. Particles coarser than 20 mesh, as a general rule, do not exhibit the high adsorptive efficiency necessary for successful percolation, whereas particles smaller than 80 mesh, though possessing adsorptive characteristics to a high degree, will give unsatisfactory yields as a result of increased soakage, and furthermore will result in the formation of filter beds so dense that the percolation rate is materially impaired.

During the activation of bauxite by heat treatment at temperatures between 600 and 1600° F., a general diminution in size of the particles subjected to the treatment occurs and an appreciable amount of fine particles below 80 mesh is produced. We have found that, though most of these particles, that may be termed for purpose of convenience "bauxite dust," are removable by mechanical means, such as screen sifting and the like, comparatively large amounts are retained by the coarser bauxite particles and defy attempts of removal heretofore suggested. We have discovered that this phenomenon is due to the fact that an activated bauxite possesses a pronounced power of attraction for its own dust, and will usually exercise this power of attraction to the extent of causing retention of up to 10% of bauxite dust (calculated on the total amount of bauxite present after separation of the conventionally removable dust). We have found that the adsorptive efficiency of activated bauxite of a particle size between 20 and 80 mesh for the refining of hydrocarbon products is greatly impaired and materially reduced by reason of these dust particles which tenaciously adhere to the particles of larger size despite the fact that the dust particles, as such, inherently possess an adsorptive efficiency which is superior to that of bauxite particles of coarser mesh size. The adsorptive efficiency of bauxite particles of a size between 20 and 80 mesh progressively decreases with the presence of increasing amounts of particles smaller than 80 mesh until a minimum is reached at a point where the dust content of the bauxite reaches approximately 10%. With higher dust contents the adsorptive efficiency again commences to increase as the amount of dust present in excess of approximately 10% commences to add its inherent adsorptive efficiency to that of the coarser bauxite particles, the efficiency of which is impaired by reason of the first 10% dust found to be tenaciously adhering to the coarser particles. With a dust content of approximately 25%, the adsorptive efficiency of the dust containing bauxite will have again reached the adsorptive efficiency of substantially completely dedusted bauxite, and will further increase with increasing dust content. Though from the standpoint of adsorptive efficiency the presence of large amounts of dust may be desirable, we have found that dust will interfere with the successful percolation treatment to such an extent that the removal of the dust present in excess of 15 and preferably in excess of 10% is a prerequisite to successful bauxite filtration with regard to filtration yield and rate of flow of the hydrocarbon material through the filter bed.

In the following table, the adsorptive efficiency of a bauxite of a particle size between 20 and 80 mesh and containing varying amounts of dust, is shown:

*Table I*

[Adsorptive efficiency of bauxite containing varying amounts of dust]

| | Percent dust | Gravity test |
| --- | --- | --- |
| Bauxite | 0 | 77 |
| | 5 | 77 |
| | 10 | 60 |
| | 15 | 62 |
| | 20 | 72 |
| | 25 | 77 |
| | 30 | 82 |
| | 100 | 88 |

As shown in the table, the adsorptive efficiency of the bauxite or the dust (last horizontal column), respectively, is expressed in terms of gravity test. The term "gravity test" of a particular adsorbent material, as developed by one of us to express adsorptive efficiency of such material, connotes, with the omission of decimals, the difference between the respective specific gravities of the hydrocarbon material to be refined before and after its filtration through the adsorbent. Since for a successful percolation treatment a dust content in excess of 15% and preferably in excess of 10% is undesirable, and since up to 10% of dust content constitutes an impairment of the adsorptive efficiency of the filter material, it is requisite for efficient percolation operations to remove substantially all of the dust including the portion adhering to the coarser particles.

We have discovered that the attractive power of the bauxite for its own dust varies with certain temperatures and that a temperature range of minimum attraction exists within which the attractively adhering bauxite dust may be removed from the bauxite by suitable means, such as a blast or current of air or other suitable gas. This temperature range of minimum attraction of bauxite for bauxite dust lies between 500 and 1600° F., and preferably between 600 and 1200° F. When blowing air over or through the bauxite within this temperature range and preferably in countercurrent fashion, the attractively adhering bauxite dust is substantially completely removed, and we have termed and will hereafter refer to such temperature ranges as the "effective dedusting temperature range" of the bauxite. For the purpose of preventing the cooling of the bauxite to below the effective dedusting temperature range prior to the substantially complete removal of attracted dust, we prefer to preheat the air before blowing the same over or through the bauxite, and have found that best results and a substantially dust-free bauxite are obtained by not only maintaining the bauxite within the effective dedusting temperature range but also passing the air over or through the bauxite after the air has been heated to a temperature of at least 120° F., and preferably of at least 220° F. The current or blast of air or other suitable gas passing over or through the bauxite should have a velocity sufficient to remove the dust particles from the bauxite while the same is within the effective dedusting temperature range. With air velocities of from 4 to 6 feet/sec., and a preferred velocity of 5 feet/sec., satisfactory results are obtained.

The conditioning of bauxite in accordance with our invention is preferably carried out in the following manner: The bauxite ore is roasted in accordance with conventional practice by heating the same in a suitable furnace or kiln, such as a Herreshoff type furnace, a rotary kiln, a vertical stationary furnace, or the like, to a temperature of from 600 to 1600° F., and preferably to a temperature of from 1000 to 1200° F. During this heating or calcining operation, sufficient air is admitted to give at all times and to all parts of the furnace good oxidizing conditions. The calcined bauxite when removed from the calcining furnace preferably possesses a temperature in excess of 1000° F., and is now subjected to the dedusting treatment which is preferably carried out in a closed receptacle through which a stream of hot bauxite is passed either in a vertical column by means of gravity, as for instance in cascade fashion or, horizontally by means of conveyors, being met in its travel and while its temperature is within the effective dedusting temperature range of from 500 to 1600° F., by an air current (preferably preheated) of a velocity of from 4 to 6 feet/sec., and preferably of 5 feet/sec. The effective dedusting temperature range is best maintained by passing the bauxite into the receptacle at a temperature as near as possible to the preferred upper limit of the effective dedusting temperature, i. e., 1200° F., and preferably at a slightly higher temperature. The air or other suitable gas is passed countercurrently over or through the bauxite in such manner that, at the point of first contact of the stream of air with the bauxite and while the bauxite is still within the effective dedusting temperature range, the air is at a temperature preferably of from 120 to 220° F., and at the point of last contact with the bauxite, i. e., at the bauxite feed end of the receptacle, the air is at a temperature of at least 200° F., and preferably of at least 250° F. The dust carried away by the countercurrent stream or blast of air or other suitable gas is precipitated and discharged into a bin or tank from which it is periodically removed.

The comparative efficiency of bauxite activated in accordance with our invention, may be seen from Table II below. A Pennsylvania neutral oil was percolated through bauxite activated in accordance with prior practice and containing 1.1–10% of dust attractively adhering thereto, and through a substantial dust-free bauxite prepared in the afore-indicated manner:

*Table II*

| 1<br>Percent dust | 2<br>Spec. gr. | 3<br>Gravity<br>test No. |
| --- | --- | --- |
| 0 | .8500 | 120 |
| 1.1 | .8504 | 116 |
| 2.7 | .8515 | 105 |
| 3.1 | .8512 | 108 |
| 3.8 | .8512 | 108 |
| 4.5 | .8546 | 74 |
| 6 | .8551 | 69 |
| 8 | .8557 | 63 |
| 10 | .8558 | 62 |

The filtered stock was a Pennsylvania neutral oil of a specific gravity of .8620. The second column of the table shows the respective gravities of the stock after filtration through bauxite containing dust in the amounts indicated in the first column, while the third column shows the respective gravity test numbers. In accordance with the foregoing definition of gravity number, it is evident that the higher the gravity test number the more efficient the bauxite. It will be seen from the table that the gravity test number and thus the efficiency of the adsorbent decreases with increasing dust content.

When the adsorptive efficiency of the bauxite has been exhausted, the same may be reactivated. The reactivation may be conducted with or without the prior removal of retained hydrocarbons by means of suitable solvents, by roasting the bauxite at an elevated temperature, and preferably between 600 and 1600° F., whereby the adsorbed organic matter is carbonized and substantially completely removed by maintaining an oxidizing atmosphere in the furnace or kiln during the roasting operation. This reactivation or regeneration of the bauxite and its subsequent reuse as an adsorbent refining material may be carried out repetitiously. In each regeneration, however, a considerable amount of dust is formed, which partly adheres to the bauxite. Such dust may be removed in the manner hereinbefore described. It is essential that at least the loose dust, but preferably substantially the entire dust including the bauxite adhering portion, be removed after each regeneration in order to again impart to the bauxite maximum adsorption efficiency.

We have discovered that the tendency of a bauxite to give rise to dust formation during subsequent regenerations, which may be termed the "friability" of a bauxite is, at least in part, a function of the iron content of the original bauxite. As a further embodiment of our invention, we have found that it is possible to stabilize the bauxite, that is, to substantially reduce its friability and thus substantially reduce dust formation during subsequent regenerations, by subjecting the activated bauxite to a ferriferous matter removing operation followed by the afore-described dedusting procedure.

For the purpose of reducing the friability of a ferriferous bauxite in accordance with our invention, we first activate the same by a suitable roasting treatment in the ordinary manner. Thereafter the activated bauxite, with or without the removal of dust, and preferably without such removal, is contacted with a hydrocarbon material preferably by percolating the same through the bauxite. The bauxite, which at this stage contains adsorbed carbonaceous material is then heated in a reducing atmosphere to a temperature of from 500 to 800° F., and preferably to a temperature of 600° F., for a time sufficient to transform the ferriferous matter contained in the bauxite to para-magnetic form. This reducing operation is preferably carried out in a Herreshoff or the like type furnace in which air is substantially excluded, and in which, for the purpose of further assisting the maintenance of reducing conditions, the burners of the furnace are so adjusted that they furnish a very rich hydrocarbon mixture. The carbonization of the hydrocarbon material during the heating of the bauxite, and, if desired, assisted by the reducing effect of the richly adjusted burners, will transform the ferriferous matter into para-magnetic form. The bauxite treated in this manner is then subjected to the action of a magnetic separator, preferably by passing the same through magnetized iron rolls or a series of such rolls, whereby the removal of the para-magnetic material is effected. Or, the para-magnetic material may be removed from the treated bauxite by means of a gravity separator. The bauxite, to substantial extent now free from para-magnetic material, is then again heated and calcined under ordinary conditions of activation, i. e., by roasting at a temperature of from 1000° to 1200° F., in an oxidizing atmosphere until substantially all of the carbonaceous material contained in the bauxite has been removed by oxidation. Since considerable heat is developed in the oxidation of the carbonaceous matter, the external heat input, as a rule, may be reduced or entirely discontinued once roasting temperatures obtain. The bauxite is finally subjected to the afore-described dedusting operation. The bauxite so treated or stabilized will not give rise to excessive dust formation during subsequent regenerations and possesses a low friability.

In the refining of hydrocarbon products by percolation through a solid adsorbent material, the friability of that material may be conveniently expressed in terms of friability number and dust number.

For the purpose of determining the friability and dust numbers and thus expressing the tendency of a particular material to form dust during the processing and subsequent regeneration of the same, an attrition test is performed. This attrition test is executed by placing the material to be tested in a cylindrical can having a diameter of 6½ inches and a height of 5½ inches and containing approximately 5 steel balls (½ inch in diameter, 8 grams apiece); the cylindrical can is then rotated for ½ hour on a shaking machine or similar device at approximately 60 R. P. M. In this treatment the pounding of the steel balls will give rise to dust formation and the dust so formed furnishes an indication of the dust-forming tendencies of the original material.

The friability number connotes the 100 multiple of the difference between the mean mesh of a particular sample before and after attrition.

The dust number connotes the 100 multiple of the difference in per cent by weight of dust present after and before attrition.

In Table III below, a comparison of friability and dust numbers of unstabilized activated bauxite and of bauxite stabilized in accordance with our invention is given. The table further sets forth for the respective bauxites, the total amount of dust present after each of a number of successive regenerations:

*Table III*

|  | Dust No. | Friability No. | Percent dust | Regenerations | | |
|---|---|---|---|---|---|---|
|  |  |  |  | 10 | 50 | 100 |
| Conventionally activated bauxite | 180 | 490 | 2.7 | 7.5 | 11.0 | 17.0 |
| Stabilized bauxite | 80 | 360 | 0.20 | 0.22 | 0.21 | 0.23 |

In the aforementioned procedure for the reduction of the friability of a bauxite, though the dust formed during the first activation and prior to its contact with a hydrocarbon material may be removed if desired, it is not necessary to do so as the adsorptive efficiency of such activated bauxite, even though impaired, is sufficient for the adsorption of an amount of hydrocarbon material necessary for carbonization and the reduction of the ferriferous material to para-magnetic form. The dust present in the freshly activated bauxite may be conveniently carried, therefore, through the succeeding steps of the process, and may removed together with the dust formed during the subsequent treating steps, i. e., heat reduction and oxidative carbonization, in one single dedusting operation in the manner hereinabove set forth.

Instead of contacting the first activated bauxite but once with a hydrocarbon material, it is of course possible and frequently of advantage to use the so activated bauxite as a filtering material, i. e., repetitiously contacting the same with a suitable hydrocarbon material to be refined until its adsorptive properties are substantially exhausted and to thereafter subject the same to the procedure outlined in connection with the removal of ferriferous matter, followed by oxidative calcination and dedusting. If the bauxite is first used as a filtering material until its exhaustion, prior to the removal of ferriferous matter therefrom, it is of advantage to remove the sometimes rather high amounts of unadsorbed but mechanically retained hydrocarbon material by washing with a suitable solvent and preferably a hydrocarbon solvent boiling predominantly below 400° F., such as naphtha and the like, as the actually adsorbed matter is usually sufficient for the reduction of the ferriferous material into paramagnetic form. Without such prior removal the retained hydrocarbon material would be wasted. Its presence may even be harmful as the oxidation of the same during the calcining step is exothermic in nature, thereby tending to increase dust formation. In this combined activation and stabilization of the bauxite, as high as 7 to 10% of dust and approximately 3 to 6% of ferriferous matter is removed (both figures being calculated on the basis of the weight of the original ore).

In the afore-described stabilization treatment of a bauxite, ferriferous matter is not entirely removed. Though the remaining ferriferous matter is not sufficiently large in amount to either impair the adsorptive efficiency of the bauxite during the succeeding uses or to cause excessive dust formation during the succeeding regenerations, we have observed that after a comparatively large number of regenerations and reuses, say 40 to 50 calcinations, this ferriferous matter will again commence to impair the efficiency of the adsorbent. We have found that at this stage a large proportion of the ferriferous matter is present in para-magnetic form even though prior regenerations were conducted at least in their final stages if not exclusively in an oxidizing atmosphere. It is thus possible to remove ferriferous matter from the bauxite in para-magnetic form by magnetic separation after a number of previous oxidative regenerations without resort to a treatment under reducing conditions.

In the refining of hydrocarbon products in accordance with our invention, the material is contacted with a bauxite suitably conditioned as hereinbefore set forth by percolating the hydrocarbon material in liquid form through a bed of such bauxite. The percolation may be accomplished either at atmospheric pressure or at subatmospheric or superatmospheric pressure. Superatmospheric pressure proves advantageous in many instances and particularly in the refining of petrolatum and the like materials.

It is sometimes desirable to dilute the hydrocarbon material with a suitable diluent so as to reduce viscosity and facilitate the contact between the adsorbent and the material to be refined. Such procedure is particularly to be recommended in the case of the more viscous hydrocarbons as it will improve the flow of the same through the filter bed and decrease excessive retention thereon. Diluents that may be used for facilitating contact with the bauxite should have a sufficiently high boiling point to prevent losses during the contact treatment and a sufficiently low end point so that their removal from the refined product does not necessitate the use of injuriously high temperatures, and they should be furthermore substantially free from a displacing or solvent action upon adsorbed coloring matter. A suitable diluent is, for instance, one with an initial boiling point of from 160 to 180° F., and an end point of from 360 to 390° F., such as naphtha and similar low boiling hydrocarbons. As a general rule dilution of the stock to be refined is advisable with stocks of a Saybolt universal viscosity at 210° F., between 60 and 100 seconds, and should be used in order to obtain best results with stocks of a Saybolt universal viscosity at 210° F., above 100 seconds; stocks of a Saybolt universal viscosity at 210° F., below 60 seconds should be contacted straight, i. e., without dilution. 60 to 70 parts of diluent to 40 to 30 parts of oil stock should be used when resorting to a dilution procedure, though somewhat smaller amounts of diluent may be employed with less viscous stocks.

The temperature at which successful percolation is conducted depends to a certain extent upon whether or not dilution of the stock is practiced. In the case of straight filtration, good results are obtained at a filtration temperature between 130 and 400° F. Excellent results are normally effectuated at a temperature of the order of 250° F. Dilution filtration, on the other hand, as a general rule is normally practiced at ordinary room temperatures, e. g., 70° F.

The time of contact, i. e., the rate of flow through a given amount of adsorbent material, such as bauxite, should be so adjusted that the filtered stock issues with the desired color. When practicing dilution filtration, the time of contact between the hydrocarbon mixture and the bauxite preferably should be somewhat longer than that used in straight filtration. Time of contact may be adjusted by suitably controlling the rate of flow.

Prior to the calcination of a spent bauxite, in order to condition the same for reuse, it is a prerequisite to successful regeneration to remove excess retained hydrocarbon material by washing with a suitable solvent, such as naphtha and the like. This elimination of retained hydrocarbon material is an important factor in the regeneration of the bauxite. The oxidation of hydrocarbon matter as well as of carbonaceous matter derived from its carbonization involves an exothermic reaction which, in the oxidative calcination of bauxite containing retained hydrocarbons, will give rise to overheating, thus causing considerable impairment of the adsorptive efficiency of the bauxite, including high friability and excessive formation and/or retention of dust.

When filtering a crude hydrocarbon material through an activated or reactivated bauxite, the adsorptive affinity of the latter for coloring matter is much greater than for the other components of said material. The material most tenaciously held by or upon the surface of the bauxite particles, consists almost entirely of coloring matter. Removal of coloring matter from the bauxite may be effected by special solvents or by oxidation. Beyond these adsorbed layers of coloring matter, there are other layers containing coloring matter and hydrocarbons. In these other layers the concentration of coloring matter gradually decreases with a corresponding increase of the hydrocarbon fraction, the further away these layers are removed from the coloring matter adsorbing sphere adjacent the surfaces of the bauxite particles. These latter layers are less tenaciously held by the bauxite. These outer layers containing coloring matter and hydrocarbons constitute the retained oil which is removable by a naphtha or the like wash.

When treating a spent bauxite with a suitable solvent such as naphtha or the like to thereby remove the retained hydrocarbon matter, a considerable portion of the loosely bound coloring matter such as that contained in increasing concentrations adjacent the sphere of adsorption for coloring matter, is removed together with the hydrocarbon fraction. If the naphtha wash should then be added to further quantities of unfiltered oil in order to recover the oil from it, a portion of the originally removed coloring matter is thus reintroduced. We have discovered that it is possible to confine the redissolution of the more or less loosely adsorbed coloring matter to a minimum by allowing two to three percent and preferably 2.5% of the so-called naphtha extractable matter to remain on the bauxite. Though this percentage of naphtha extractable matter so remaining includes coloring matter and a small amount of retained hydrocarbon matter, it is insufficient to interfere with the subsequent oxidative calcination of the bauxite so as to impair its regenerated adsorptive efficiency by overheating.

In the practical removal of retained hydrocarbon material in accordance with our discovery, we prefer to proceed in the following manner: Sufficient naphtha is added to the spent bauxite while the same is still on the filter or, if desired, in a separate receptacle to thoroughly soak or wet the same. After this soaking process the spent bauxite thus saturated with naphtha is allowed to stand until the naphtha commences to separate from the bauxite particles. Upon the completion of the soaking period, an additional amount of naphtha is then percolated through the naphtha-saturated adsorbent. We have found it of advantage to use from 230 to 235 and preferably not in excess of 240 gallons of naphtha per ton of bauxite for the total treatment including the soakage. We prefer to use approximately ⅓ of this amount for the soaking operation. For the purpose of obtaining best results we prefer to maintain a temperature of from about 120 to about 150° F., and preferably of 130° F., during the soaking as well as the percolation period. A suitable naphtha that may be used in accordance with the afore-outlined procedure is preferably one having the following characteristics:

| | |
|---|---|
| A. P. I. gravity_____degrees__ | 58– 60 |
| Initial boiling point_____°F__ | 160–180 |
| 10% off at_____°F__ | 236 |
| 50% off at_____°F__ | 264 |
| 90% off at_____°F__ | 308 |
| End point_____°F__ | 360–390 |

When using a straight filtration process, i. e., without the expedient of dilution, much larger amounts of hydrocarbon material are retained by the bauxite, due to the usually relatively high viscosity of such material, than is the case when practicing dilution filtration. In this instance, it is advisable to insert the step of passing air through the bauxite to thereby remove part of the retained hydrocarbon material before the naphtha washing step. In most cases, the air blowing is continued until no further displacement of retained hydrocarbon matter by the air is effected.

After the completion of the naphtha wash a certain amount of the naphtha remains on the bauxite and must be removed. This removal of remaining naphtha is accomplished by a steaming step, preferably under pressure, which is continued as long as the issuing steam contains any perceptible odor of naphtha. It is requisite, however, to use dry or superheated steam so as to prevent the removal of adsorbed coloring matter by condensed water.

When practicing the naphtha wash in accordance with the afore-prescribed conditions, the so-called washout, i. e., naphtha solution of the retained hydrocarbon material, contains a minimum of coloring matter, and will yield a hydrocarbon stock that may be added to the subsequently to be filtered stock without appreciably affecting the color of the same. In the case of dilution filtration, the washout is directly added to the filtered stock whereas in straight filtration the naphtha is removed by distillation and the remaining oil is then added to the original filtering stock.

Where hydrocarbon materials, solid or semi-solid at ordinary temperature, such as paraffin and petrolatum and the like, are to be subjected to bauxite treatment, they may be either percolated through this material in molten condition or dissolved in a suitable solvent, being as a general rule treated in either case in the same manner as ordinary liquid hydrocarbon materials.

In the accompanying drawings we have set forth typical illustrations of procedures which may be employed in accordance with our invention.

Figure 1 is a diagrammatic representation of bauxite activation in accordance with our invention.

Figure 2 is a diagrammatic representation of the activation of bauxite and simultaneous stabilization thereof in accordance with our invention.

Figure 3:
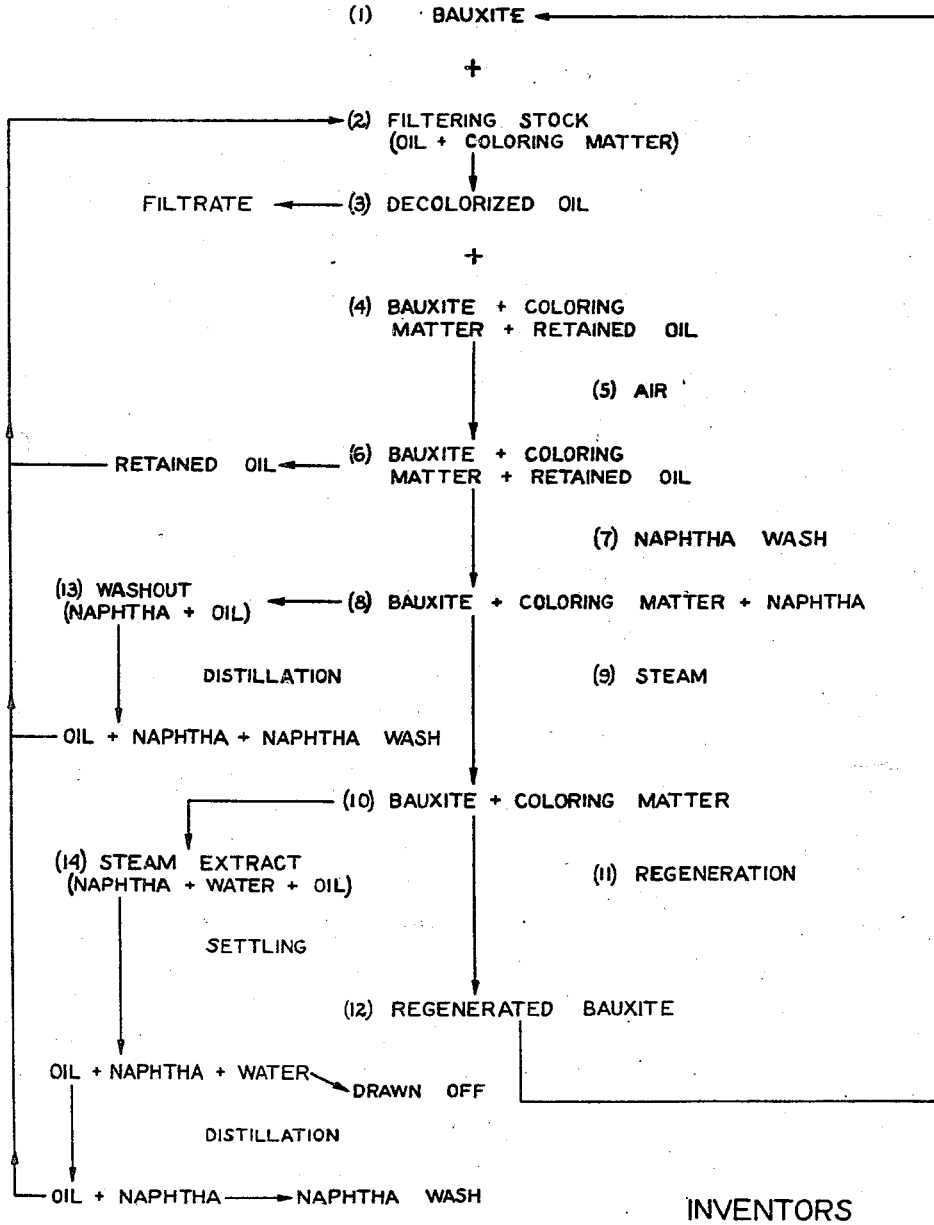
Figure 3 is a diagrammatic showing of a percolation treatment of a hydrocarbon material through an adsorbent bauxite and the regeneration of the latter.

As shown in Figure 1, the raw bauxite ore of suitable composition and of a mesh size of preferably between 20 and 80 mesh is placed in a calcination furnace, such as a 12-hearth Herreshoff furnace. Heat is applied to the various hearths preferably in such manner that the temperature of the ore on each hearth is raised by increments of approximately 100° F., until the preferred temperature of 1200° F., is reached on the last hearth. During the calcining operation sufficient air is admitted to maintain at all times and in all parts of the furnace good oxidizing conditions, and the hearth arms are preferably rotated at a speed of approximately 6 R. P. M. while the throughput is preferably regulated in such manner that not more than approximately a two inch layer is carried by the arms. The average mesh content of the original ore should preferably be the following:

Table IV

| Mesh | Bauxite ore |
|---|---|
| | Per cent |
| On 20 | 35 |
| On 40 | 35 |
| On 60 | 25 |
| On 80 | 3 |
| Through 80 | 2 |

The calcined ore as it issues from the furnace at a temperature of from approximately 800 to 1000° F., is preferably passed into and through a cascade tower, into the discharge end of which a blast of air of an approximate velocity of 5 feet/sec. is introduced. The cascade tower is preferably approximately 30 feet high. While the bauxite is passing through this tower at a temperature between 500 and 1000° F., the temperature of the air current is maintained between 150 and 250° F., issuing from the top of the tower at a temperature in excess of 220° F. The bauxite dust carried away by the air is deposited in a bin or tank attached to the upper end of the cascade tower and the discharge dedusted bauxite is passed into a storage tank or directly into the filter towers.

The treatment of the bauxite in the afore-described manner results in a diminution of particle size, which, after its processing, is reflected in substantially the following mesh content:

Table V

| Mesh | Bauxite |
|---|---|
| | Per cent |
| On 30 | 30 |
| On 40 | 40 |
| On 60 | 27 |
| On 80 | 3 |
| Through 80 | Traces |

A typical composition of a suitable bauxite ore as compared with its composition after activation is illustrated in the following table:

Table VI

| | Bauxite ore | Activated bauxite |
|---|---|---|
| | Per cent | Per cent |
| Moisture loss @110° C | 1.0 | |
| Combined water | 29.0 | 1.5 |
| Soluble alumina as Al₂O₃ | 56.0 | 80.0 |
| Soluble iron as Fe₂O₃ | 5.0 | 6.0 |
| Soluble titanium as TiO₂ | 1.0 | 1.0 |
| Insoluble residue | 8.0 | 11.5 |

In a practical embodiment of the stabilization procedure as shown in Figure 2, the bauxite ore of the same characteristics, mesh size and mesh contents as described above in connection with Figure 1, is placed into a suitable furnace, preferably of the type previously described. Heat is applied to the various hearths by means of richly adjusted gas burners, and the temperature of the ore is preferably raised on each hearth by increments of approximately 100° F., until a maximum temperature of 600° F., is obtained and maintained on at least the last three to four hearths. All air is excluded whereby a reducing atmosphere obtains sufficient to transform the ferriferous into paramagnetic matter. The "reduced" bauxite is then passed through magnetized rolls to which the para-magnetic fraction adheres. The para-magnetic matter is continuously discarded from the rolls while the bauxite of reduced iron content is subjected to an oxidative calcination treatment in the same manner as set forth in connection with Figure 1.

The mesh content of the stabilized bauxite as it issues from the cascade tower is as follows:

Table VII

| Mesh | Stabilized bauxite |
|---|---|
| | Per cent |
| On 30 | 30 |
| On 40 | 40 |
| On 60 | 25 |
| On 80 | 3 |
| Through 80 | Traces |

A typical composition of a suitable bauxite ore as compared with its composition after stabilization and activation is given in the following table:

Table VIII

|  | Bauxite ore | Stabilized bauxite |
|---|---|---|
|  | Per cent | Per cent |
| Moisture loss @ 110° C | 1.0 | |
| Combined water | 29.0 | 1.5 |
| Soluble alumina as $Al_2O_3$ | 56.0 | 83.0 |
| Soluble iron as $Fe_2O_3$ | 5.0 | 1.0 |
| Soluble titanium as $TiO_2$ | 1.0 | 1.0 |
| Insoluble residue | 8.0 | 13.5 |

In the percolation of hydrocarbon oil through an adsorbent bauxite and the subsequent regeneration of the latter as diagrammatically illustrated in Figure 3, the adsorbent bauxite suitably conditioned in accordance with either one of the procedures outlined in Figures 1 and 2 is placed in a filtering tower. The hydrocarbon oil to be refined is permitted to percolate through the bed of the adsorbent bauxite. The bauxite during the filtration is maintained between 130 and 400° F., and preferably at 250° F. The filtrate issues in a decolorized condition. The filtration is conducted in a continuous manner until the issuing oil commences to show an impairment in color. This indicates that the bauxite has substantially lost its adsorptive efficiency for coloring matter and has become substantially spent. The filtration is then discontinued and the adsorbent now containing coloring matter and retained hydrocarbon oil, is blown with air, thereby to remove a portion of the retained oil. The thusly removed hydrocarbon oil is returned to the original hydrocarbon oil stock while the so treated bauxite is subjected to a naphtha wash under conditions as hereinbefore described, which will leave on the adsorbent from 2 to 3% of naphtha extractible material. The washout containing naphtha and hydrocarbon oil may be, if desired, subjected to a distillation and the recovered hydrocarbon oil returned to the original filtering stock, while the naphtha may be returned to the wash. The bauxite now containing coloring matter and retained naphtha is subjected to a steaming step, resulting in a steam extract containing naphtha, water, and some hydrocarbon material which, by settling and distillation, is separated into its component parts which are returned to their respective containers, the water being drawn off. The bauxite containing adsorbed coloring matter is then subjected to oxidative calcination in substantially the same manner and under substantially the same conditions as described in the activation and stabilization of a bauxite in connection with Figures 1 and 2. The resulting reactivated bauxite is now ready for reuse and returned to the filtering tower. The conditioning of the bauxite up to and including the steaming step is preferably carried out in situ. While the regeneration of the bauxite may be accomplished in situ, we prefer to remove the bauxite from the filtering tower and subject the same to the oxidative calcination treatment in a suitable furnace as hereinbefore described.

We have found that the percolation process in accordance with our invention is suitable for the refining of petroleum oils including those of paraffinic, naphthenic and mixed base crudes and particularly residua derived from Pennsylvania type petroleum oils. In the following, we have set forth examples for purposes of illustration without limiting ourselves to the precise materials or the conditions of temperatures or pressures or to the amounts specified.

Example I

A Mid-Continent bright stock was respectively percolated through a bauxite activated and dedusted in accordance with our invention and through a bauxite activated without removal of adhering dust particles, at a temperature of 250° F., and under atmospheric pressure. The respective bauxites possessed the following characteristics:

|  | Dust | Gravity test | Screen analysis | | | |
|---|---|---|---|---|---|---|
|  |  |  | On 30 | On 40 | On 60 | On 80 |
|  | Per cent | | Per cent | Per cent | Per cent | Per cent |
| Activated dedusted bauxite | 0 | 108 | 50 | 25 | 23 | 2 |
| Activated bauxite, dust retained | 4.0 | 94 | 49 | 23 | 22 | 2 |

A comparative analysis of the qualities of the aforementioned stock before and after filtration through the respective bauxites is given in the following table:

Table IX

|  | Original | Filtered through activated dedusted bauxite | Filtered through activated undedusted bauxite |
|---|---|---|---|
| Gravity °API | 20.7 | 24.1 | 23.8 |
| Vis./210° F | 185 | 162 | 163 |
| Vis./100° F | 5,200 | 3,500 | 3,600 |
| Vis. index | 68 | 75 | 73 |
| Carbon test percent | 3.4 | 1.9 | 2.1 |

Example II

A Pennsylvania bright stock was percolated respectively through a bauxite stabilized in accordance with our invention and through a bauxite activated without stabilization and removal of adhering dust particles at a temperature of 250° F., and at atmospheric pressure. The respective bauxites possessed the following characteristics:

|  | Dust | $Fe_2O_3$ | Gravity test | Screen analysis | | | |
|---|---|---|---|---|---|---|---|
|  |  |  |  | On 30 | On 40 | On 60 | On 80 |
|  | Percent | Percent | | | | | |
| Stabilized bauxite | | 1 | 115 | 29 | 40 | 28 | 3 |
| Activated unstabilized bauxite | 2 | 6.0 | 93 | 30 | 40 | 27 | 3 |

The following table shows a comparative analysis of the properties of the stock before and after filtration through the respective bauxites:

Table X

|  | Original | Filtered through unstabilized activated bauxite | Filtered through activated bauxite stabilized |
|---|---|---|---|
| Gravity °API | 25.8 | 27.3 | 28.2 |
| Vis./210° F | 150 | 136 | 132 |
| Vis./100° F | 2,410 | 1,910 | 1,700 |
| Vis. index | 99.4 | 104.2 | 106 |
| Carbon percent | 2.20 | 1.10 | 0.6 |

The foregoing description is by way of illustration and not of limitation, and we are not to be limited to any details but only by the appended claims in which we have endeavored to claim broadly all inherent novelty.

We claim:

1. The process of refining petroleum hydrocarbons, which comprises bringing said hydrocarbons into intimate contact with thermally activated bauxite predominating in particles of a particle size within the range of 20 to 80 mesh, which have been contacted at a temperature of from 1000° F. to 1200° F. with a current of preheated air having a velocity of from 4 to 6 feet per second to substantially free said particles of adherent relatively finer particles inseparable therefrom by screening, said air being at a temperature of from 120° F. to 220° F. at the point of first contact with said bauxite and at a temperature of from 200° F. to 250° F. at the point of last contact with said bauxite.

2. The process of refining petroleum hydrocarbons which comprises bringing said hydrocarbons into intimate contact with thermally activated bauxite predominating in particles of a particle size within the range of 20 to 80 mesh which has been contacted at a temperature of from 1000° F. to 1200° F. with a current of preheated air having a velocity of from 4 to 6 feet per second to substantially free said particles of adherent relatively finer particles inseparable therefrom by screening.

3. The process of refining petroleum hydrocarbons which comprises bringing said hydrocarbons into intimate contact with thermally activated bauxite predominating in particles of a particle size within the range of 20 to 80 mesh which has been contacted at a temperature of from 1000° F. to 1200° F. with a current of preheated air having a velocity of from 4 to 6 feet per second to substantially free said particles of adherent relatively finer particles inseparable therefrom by screening, said air being preheated to a temperature between 120° F. and 220° F. prior to contacting with the bauxite.

4. The process of refining petroleum hydrocarbons which comprises bringing said hydrocarbons into intimate contact with thermally activated bauxite predominating in particles of a particle size within the range of 20 to 80 mesh which has been contacted at a temperature of from 500° F. to 1600° F. with a current of preheated air having a velocity of from 4 to 6 feet per second to substantially free said particles of adherent relatively finer particles inseparable therefrom by screening, said air being preheated to a temperature between 120° F. and 220° F. prior to contacting with the bauxite.

FERDINAND W. BRETH.
ANTHONY KINSEL.